United States Patent [19]
Pherigo

[11] Patent Number: 5,778,544
[45] Date of Patent: Jul. 14, 1998

[54] COMBINED RIGHT-HAND/LEFT-HAND HORIZONTAL HEADLAMP INDICATOR DEVICE

[75] Inventor: Douglas Pherigo, Loves Park, Ill.

[73] Assignee: ELCO Textron Inc., Rockford, Ill.

[21] Appl. No.: 813,911

[22] Filed: Mar. 7, 1997

Related U.S. Application Data

[60] Provisional application No. 60/021,193 Jul. 3, 1996.
[51] Int. Cl.⁶ .................................................. G01C 9/32
[52] U.S. Cl. .......................... 33/335; 33/389; 116/323; 362/66
[58] Field of Search ................... 33/286, 288, 335, 33/365, 368, 377, 379, 384, 385, 386, 387, 389; 116/319, 321, 323, 324, 328; 362/66

[56] References Cited

U.S. PATENT DOCUMENTS

| 4,564,322 | 1/1986 | Stapley | 33/384 |
| 5,032,964 | 7/1991 | Endo et al. | 362/66 |
| 5,317,486 | 5/1994 | Schmitt | 362/66 |
| 5,359,499 | 10/1994 | Denley | 33/385 |
| 5,408,391 | 4/1995 | Denley | 33/335 |
| 5,467,255 | 11/1995 | Denley | 362/66 |
| 5,506,759 | 4/1996 | Shirai et al. | 33/385 |
| 5,564,361 | 10/1996 | Satterwhite | 116/323 |

FOREIGN PATENT DOCUMENTS

| 47938 | 5/1911 | Austria | 33/368 |

Primary Examiner—G Bradley Bennett
Attorney, Agent, or Firm—Trexler, Bushnell, Giangiorgi & Blackstone, Ltd.

[57] ABSTRACT

A non-handed headlamp position indicator device is used to denote the proper aiming or "zero position" of a movable reflector component mounted in a stationary component of a headlamp arrangement so that a vehicle mechanic can easily return the headlamp in the moveable reflector component to the zero position. The non-handed indicator device of the present invention utilizes one component that can be used for right-hand and left-hand applications. The indicator device includes a bracket mounted on the reflector beneath an opening in the stationary housing which includes a U-shaped track portion. An arrow member is mounted on the U-shaped track portion and is slidable around the track portion. A scale, which includes a zero indicia, is provided on the stationary housing proximate to the opening. After the reflector component is moved to its desired zero position, the arrow member is slid along the track portion until it aligns with the zero indicia on the scale for providing an indication of the horizontal zero position of the reflector. The arrow member is not thereafter moved. If the reflector becomes misaligned for any reason, the reflector can easily be returned to the zero position by moving the reflector until the arrow member once again aligns with the zero indicia on the scale. A bubble level assembly for providing an indication of the vertical zero position may also be provided on the indicator device.

13 Claims, 4 Drawing Sheets 5,778,544

1

COMBINED RIGHT-HAND/LEFT-HAND HORIZONTAL HEADLAMP INDICATOR DEVICE

This application claims the filing date of Provisional Application Ser. No. 60/021,193 filed on Jul. 3, 1996 by inventor Douglas Pherigo and entitled "Combined Right-Hand/Left-Hand Horizontal Headlamp Indicator Device".

BACKGROUND OF THE INVENTION

This invention is generally directed to a non-handed indicator device for indicating the horizontal and vertical zero positions of a vehicle headlamp in a vehicle, such as a truck or an automobile. More particularly, the invention contemplates a single left-hand/right-hand indicator device for indicating the horizontal zero position of a headlamp in a vehicle, and usable with either headlamp.

Headlamp indicator devices need to be left-hand or right-hand oriented in some instances resulting in a need for additional mounting components and leading to confusion on the assembly line. Prior art indicator devices use a left-hand horizontal scale and a right-hand horizontal scale on each indicator device thereby requiring separate indicators for left-hand or right-hand applications, see U.S. Pat. No. 5,317,486. This presents some problems in the overall assembly operation as the operator must be sure he or she has the correct components for the right-hand and left-hand sides as they are not interchangeable.

The present invention presents a novel horizontal headlamp non-handed indicator device which provides for right-hand and left-hand applications and which can also indicate proper vertical positioning. Other features and advantages will become apparent upon a reading of the attached specification in conjunction with an examination of the attached drawings.

OBJECTS AND SUMMARY OF THE INVENTION

A general object of the present invention is to provide a novel non-handed indicator device for denoting the proper aiming position of a headlamp in a vehicle, such as a truck, automobile or the like.

An object of the present invention is to provide a novel non-handed indicator device that is a single component that is useable in both right-hand and left-hand applications for denoting the horizontal zero position of a headlamp in a vehicle, and usable with either headlamp on the vehicle.

Another object of the present invention is to provide a novel non-handed indicator device that denotes proper aiming of both horizontal and vertical positioning of the headlamp.

Briefly, and in accordance with the foregoing, the present invention discloses a non-handed headlamp position indicator device for denoting the proper aiming or "zero position" of a movable reflector component mounted in a stationary component of a headlamp arrangement on a vehicle, such as a truck, automobile or the like, so that a vehicle mechanic can easily return the headlamp mounted in the moveable reflector component to the zero position. The non-handed indicator device of the present invention utilizes one component that can be used for right-hand and left-hand applications.

The non-handed indicator device includes a bracket mounted on the reflector beneath an opening in the stationary housing. The bracket has a U-shaped track portion

2 connected thereto and a projection which extends outwardly from the bracket and engages in a pocket formed in the reflector component. An arrow member is mounted on the U-shaped track portion and is slidable relative thereto. The track portion includes a curved section and a pair of relatively linear sections at both ends of the curved section. The curved section has a width which is less than the width of the relatively linear sections so that the arrow member can be easily slid around the length of the U-shaped track portion. For each headlamp, a scale, which includes a zero indicia, is mounted on the stationary housing proximate to the opening towards the pivot point.

After the reflector component is moved to its desired zero position, the arrow member is slid along the track portion until it aligns with the zero indicia on the scale for providing an indication of the horizontal zero position of the reflector. The arrow member is not thereafter moved. If the reflector becomes misaligned for any reason, the reflector can easily be returned to the zero position by moving the reflector until the arrow member once again aligns with the zero indicia on the scale.

If desired, the non-handed indicator device of the present invention can also include a bubble level assembly mounted on the bracket for providing an indication of when the reflector is vertically zeroed. Such bubble level assemblies are well-known in the art for providing an indication of the vertical zero position of the reflector, see U.S. Pat. No. 5,317,486.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
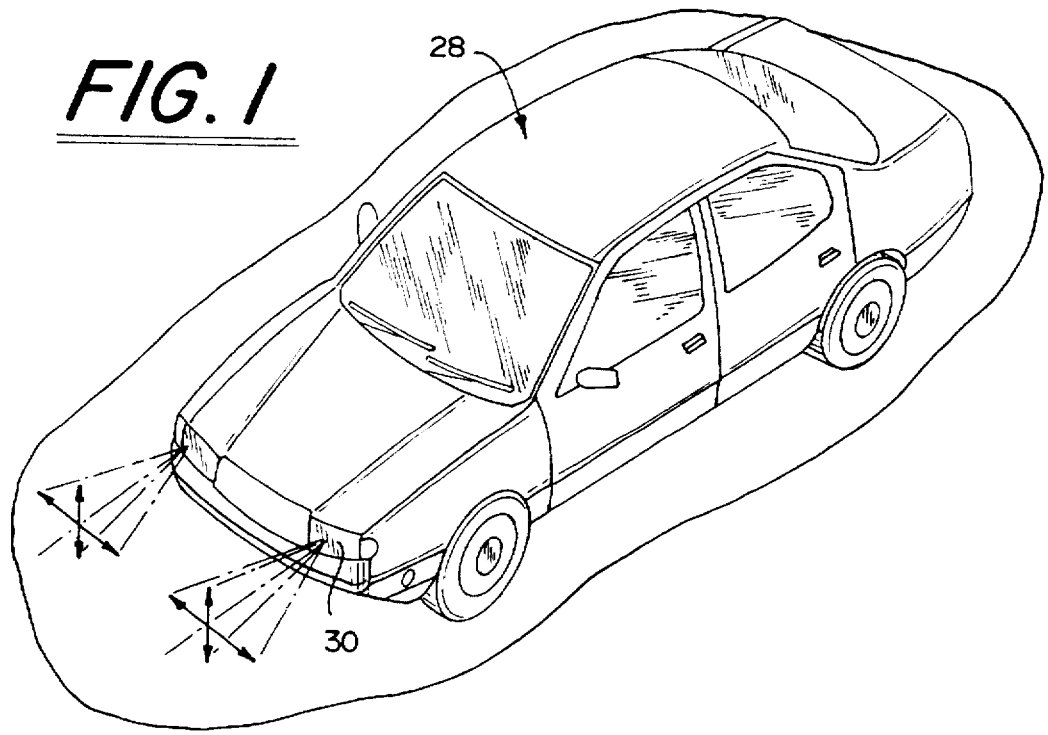
FIG. 1 is a perspective view of an automobile on which the combined right-hand/left-hand horizontal headlamp indicator device of the present invention is positioned.
Figure 2:
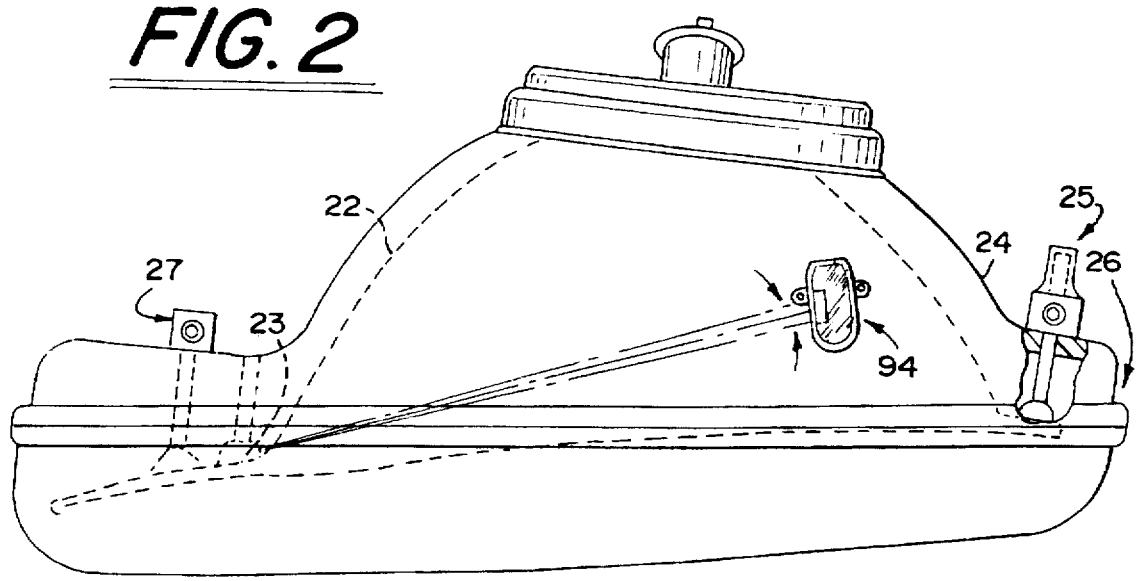
FIG. 2 is a top elevational view of a headlamp arrangement on which the combined right-hand/left-hand horizontal headlamp indicator device of the present invention is positioned.
Figure 3:
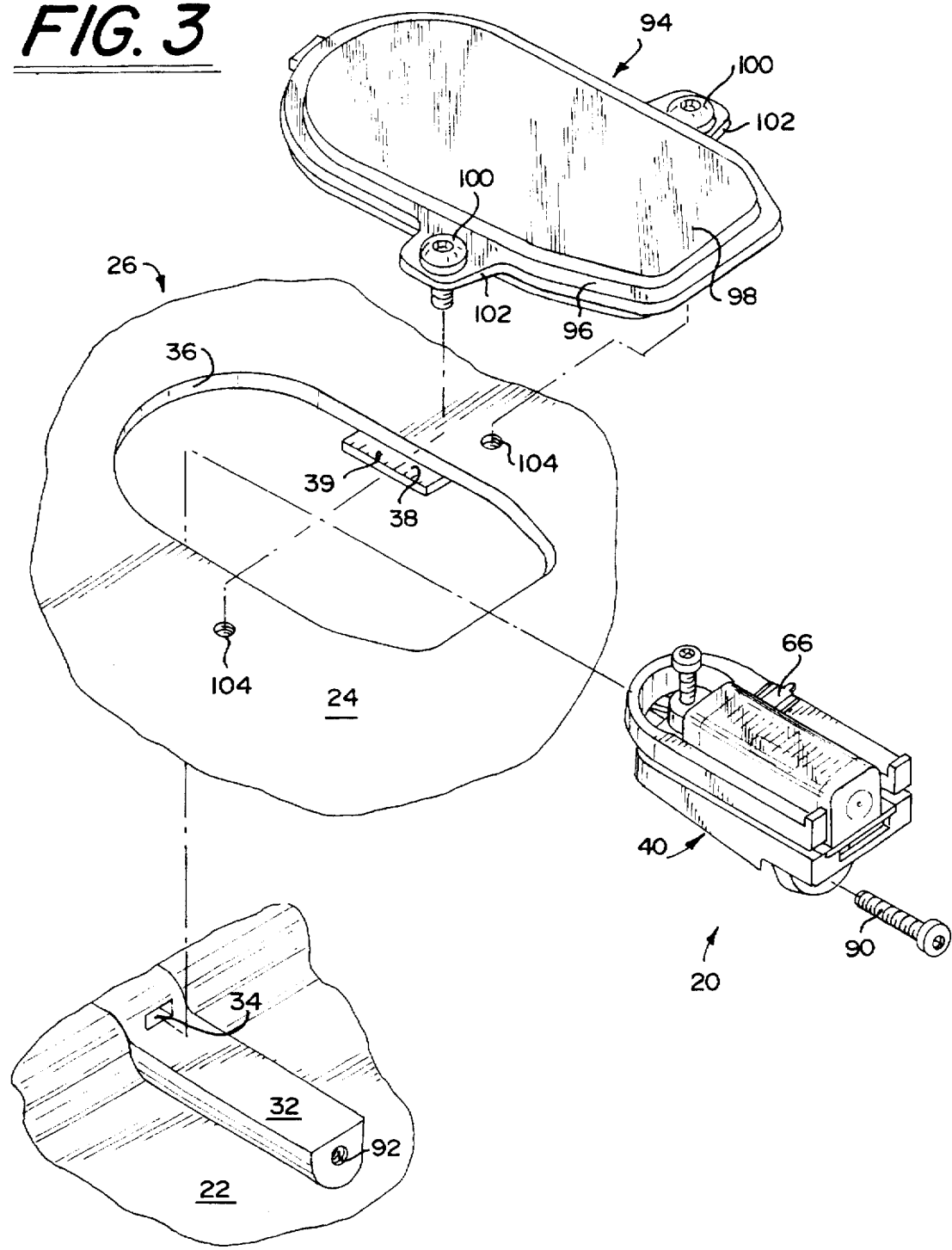
FIG. 3 is an exploded view of the components of the headlamp arrangement, shown partially, and the combined right-hand/left-hand horizontal headlamp indicator device.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention discloses a non-handed headlamp position indicator device 20 for denoting the proper aiming or "zero position" of a movable reflector component 22 mounted in a stationary housing 24 of a headlamp arrangement 26 of a vehicle 28, such as a truck, automobile or the like, so that a vehicle mechanic can easily return the headlamp mounted in the moveable reflector component 22 to the zero position. Prior to the present invention, headlamp position indicators needed to be left-hand or right-hand oriented in some instances resulting in a need for additional mounting components and leading to confusion on the assembly line. The non-handed indicator device 20 of the present invention eliminates the need for additional mounting components because of right-hand or left-hand applications and instead, utilizes one component that can be used for right-hand and left-hand applications.

A vehicle 28, such as a truck or automobile, has headlamp 30 on the front on either side thereof. The headlamp 30 can be adjusted vertically as well as horizontally. Horizontal zeroing will take place vis-a-vis the novel track portion of the non-handed indicator device 20 as described herein. Vertical zeroing will take place vis-a-vis the non-handed indicator device 20 of the present invention as described herein, utilizing a bubble level as is well known in the art, see U.S. Pat. No. 5,317,486.

The movable reflector component 22, to which the non-handed indicator device 20 is mounted, can pivot or be adjusted in the horizontal plane relative to the stationary housing 24 by means of a headlamp adjustor mechanism 25 which pivots the reflector component 22 around a fixed pivot 23 on the stationary housing 24. A like adjustor mechanism 27 is employed to move or pivot the reflector component 22 in the vertical plane. Headlamp adjustor mechanisms are well-known in the art and a variety of mechanisms can be used with the present invention.

The headlamp position indicator device 20 of the present invention is affixed to a projection 32 which is formed on the reflector component 22 and within a pocket 34 formed on the movable reflector component 22 proximate to and spaced above the projection 32. The projection 32 and the pocket 34 may be integrally formed on the reflector component 22 or may be provided as separate components which are secured to the reflector component 22 by suitable means. The reflector component 22, projection 32 and the pocket 34 are fabricated from a thermal setting material which has a hardness that is close to ceramic materials.

The indicator device 20 of the present invention is mounted to the projection 32 immediately below an opening 36 in the stationary housing 24 so that the indicator device 20 can be viewed from the exterior of the headlamp arrangement 26. A horizontal scale 38 is fixed on the stationary housing 24 proximate to the opening 36 and does not move relative to the reflector component 22. On each headlamp arrangement 26, the horizontal scale 38 is mounted on the stationary housing 24 between the indicator device 20 and the fixed pivot 23 on each headlamp. The scale 38 in the illustrated embodiment is provided on a member which extends outwardly from the edge of the opening 36. The scale 38 could be provided on a decal affixed to the outer surface of the housing 24 proximate to the opening 36. The scale 38 has a plurality of graduations 39, which are made from black two part epoxy ink or ceramic, formed thereon. The projection 32 and opening 36 are provided at a predetermined distance from the moveable reflector component pivot 23 location.

The indicator device 20 of the present invention includes a molded plastic mounting bracket 40, a bubble level assembly 42, a vial clip or stamping 44 and an adjusting screw 46.

The mounting bracket 40 includes a base portion 48 and a track portion 50. The base portion 48 and the track portion 50 may be integrally formed as one-piece or as separate components, as illustrated. Each of the base portion 48 and the track portion 50 is formed from a suitable material, such as nylon.

The base portion 48 is elongate and is generally a rectangularly-shaped frame 49 with a cutout in the middle of the frame 49. A boss 52 extends downwardly from the frame 49, perpendicular thereto, and has an aperture 54 formed therethrough. A forward extending projection 56 is provided on the front of the frame 49. The forward extending projection 56 is a locating and front lock down feature which mates with the pocket 34 formed on the moveable reflector component 22.

The track portion 50 of the mounting bracket 40 is U-shaped having a curved section 58 and two relatively linear sections 60, 62 which extend from the ends of the curved section 58 and are parallel to each other. Each of the relatively linear sections 60, 62 has a predetermined height and thickness. The curved section 58 of the U-shaped track portion 50 has a predetermined height, and a predetermined thickness which is less than the predetermined thickness of the relatively linear sections 60, 62. This reduced thickness of the curved section 58 allows the indicator member 66 to move along this curved section. A protrusion 63 extends upwardly from the end of each of the relatively linear sections 60, 62. The track portion 50 has four mounting legs 64 for connecting the track portion 50 to the base portion 48 as described herein. Other than the four mounting legs 64, the track portion 50 is spaced apart from the base portion 48 a predetermined distance.

Figure 4:
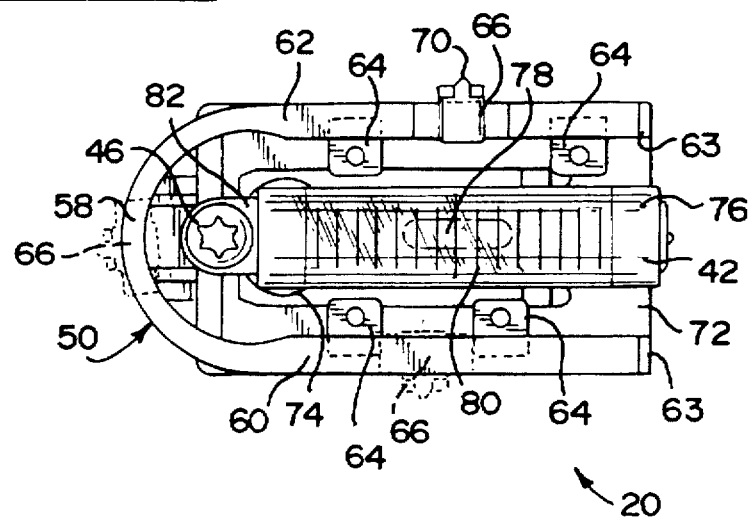
FIG. 4 is a top elevational view of the combined right-hand/left-hand horizontal headlamp indicator device.
Figure 5:
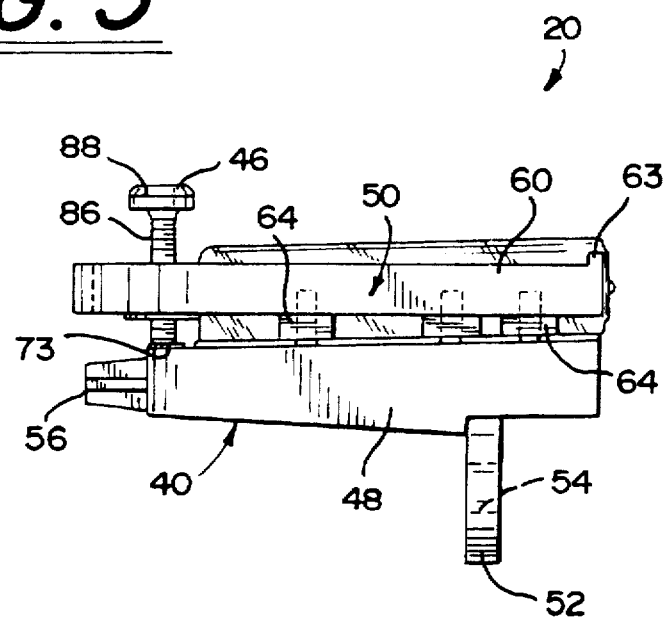
FIG. 5 is a side elevational view of the combined right-hand/left-hand horizontal headlamp indicator device.
Figure 6:
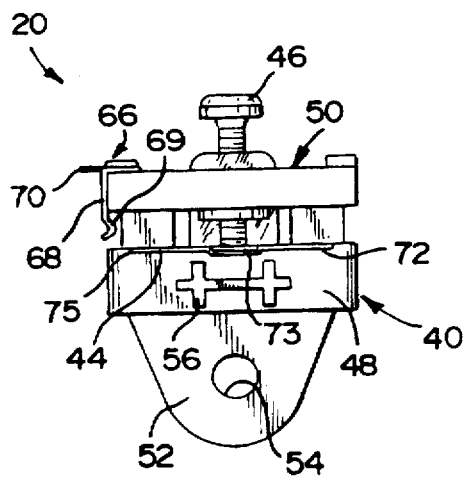
FIG. 6 is a front elevational view of the combined right-hand/left-hand horizontal headlamp indicator device.
Figure 7:
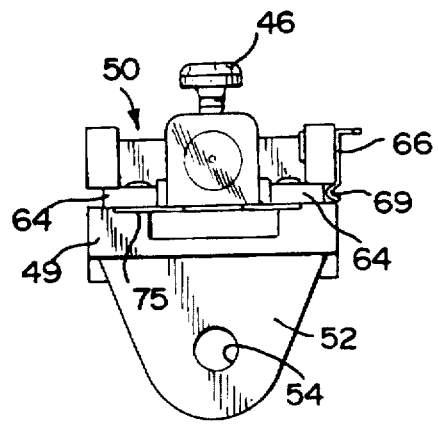
FIG. 7 is a rear elevational view of the combined right-hand/left-hand horizontal headlamp indicator device.
Figure 8:
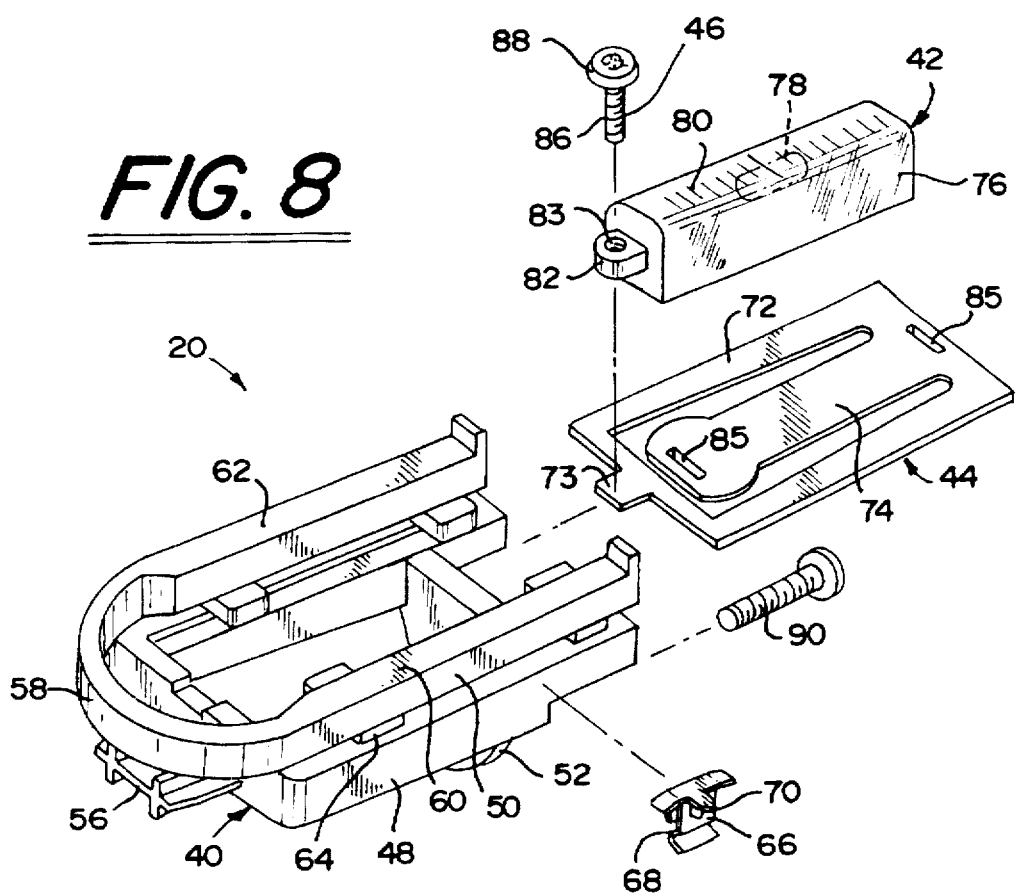
FIG. 8 is an exploded view of the components of the combined right-hand/left-hand horizontal headlamp indicator device.

An indicator arrow member 66 is releasibly and slidably engaged with the track portion 50. The indicator arrow member 66 is formed from a clip 68 and includes a pointer 70 and is stamped or formed from a suitable material, such as metal. The clip 68 is removably attached to and generally encircles the track portion 50, such that a bifurcated tang portion 69 of the clip 68 is engaged within the spacing between the track portion 50 and the base portion 48 of the mounting bracket 40. The clip 68 is slidable relative to the track portion 50. The pointer 70 points outwardly from the U-shaped track portion 50 for reasons described herein. The U-shaped design of the track portion 50 is utilized so that the indicator arrow member 66 can be positioned at any location along the relatively linear sections 60, 62 or curved section 58 of the track portion 50, thereby effectively eliminating the left-hand/right-hand problem as described herein. As shown in FIG. 4, the indicator arrow member 66 is shown in solid lines on the upper side along the relatively linear section 62 of the device 20 and in phantom lines on the curved section 58 and on the lower side along the relatively linear section 62 of the device 20. The positions shown in phantom lines are examples of alternate positions to which the indicator arrow member 66 can be moved. The protrusions 63 prevent the indicator arrow member 66 from being slid off of the end of the relatively linear sections 60, 62 of the track portion 50.

The stamping 44 is provided for mounting the bubble level assembly 42 on the mounting bracket 40. The stamping 44 is formed from a suitable material, such as stainless steel, and includes an outer rectangularly-shaped frame portion 72 with a tongue portion 74 that extends into the middle of the frame portion 72. The tongue portion 74 and the frame portion 72 are spaced apart from each other and the tongue portion 74 is flexible relative to the frame portion 72. The frame portion 72 is mounted on the base portion 48 of the mounting bracket 40 by suitable means, such as adhesive. A forward extending tang 73 is provided along the front of the frame portion 72 at the center of the front thereof and sits against the base portion 48.

The stamping 44 is snap-fit or otherwise suitably secured to the upper surface of the base portion 48 and sits within a groove 75 formed in the upper surface of the base portion 48 to hold the periphery of the stamping 44 in place. The mounting legs 64 of the track portion 50 are preferably secured on the upper surface of the stamping 44 by suitable means, such as adhesive, unless the track portion 50 and base portion 48 are integrally formed together. The mounting legs 64 are positioned between the relatively linear sections 60, 62 of the U-shaped track portion 50 and the stamping 44. Each mounting leg 64 does not extend across the entire width of the respective relatively linear sections 60, 62 such that each mounting leg 64 is spaced a predetermined distance from the outermost surface of the relatively linear sections 60, 62 of the track portion 50.

The bubble level assembly 42 includes a vial 76 which holds a liquid which has an air bubble 78 formed therein. The vial 76 is formed from Amorpflous Nylon. The liquid housed in the vial 76 is preferably mineral spirit and a green fluorescent may be added to the liquid. The vial 76 has a plurality of graduations 80 made from black two part epoxy ink or ceramic.

The vial 76 has a boss 82 integrally formed therewith and which extends outwardly therefrom. The boss 82 is of a predetermined height and has an elongated threaded bore 83 formed therethrough, through which the adjusting screw member 46 is engaged. The vial 76 is mounted on the tongue portion 74 of the stamping 44 by suitable means, such as adhesive or by providing tabs on the bottom the vial 76 and heat staking the tabs through apertures 85 provided in the tongue portion 74 of the stamping 44. The boss 82 bridges the gap between the tongue portion 74 and the frame portion 72 of the stamping 44 such that the boss 82 overlaps the frame portion 72 and the forwardly extending tang 73 of the stamping 44. The threaded bore 83 through the boss 82 aligns with the forwardly extending tang 73 of the stamping 44.

The adjusting screw member 46 is disposed inwardly or forward of the vial 76 and is engaged with the threaded bore 83 through the boss 82 such that the bottom end of the adjusting screw member 46 engages against the tang 73. The adjusting screw member 46 has a threaded shank portion 86 which extends from a head 88. The head 88 has a TORX® drive system provided thereon for rotating the adjusting screw member 46, but may be provided with other hex drive systems.

To mount the indicator device 20 on the projection 32 formed on the reflector component 22, the projection 56 is seated in the pocket 34 formed on the reflector component 22. This eliminates a screw as well as preventing the forward edge of the bubble vial 76 from being forced up. When the projection 56 is fully seated within the pocket 34, the base portion 48 sits on top of the projection 32 and the boss 52 abuts against the end of the projection 32. A screw 90 is provided and is passed through the aperture 54 in the boss 52 and is inserted into a threaded bore 92 in the end of the projection 32. The screw 90 has a threaded shank portion which extends from a head. The head has a TORX® drive system provided thereon for rotating the screw 90, but may be provided with other hex drive systems. The screw 90 is tightened to secure the rear end of the indicator device 20 to the projection 32. When mounted, the indicator device 20 is seated below the opening 36 and proximate to the horizontal scale 38.

Thereafter, a view window 94 is mounted on the stationary housing 24 and over the opening 36 to prevent the entrance of foreign materials into the stationary housing 24. The distance from the view window 94 to the indicator device 20 will vary with the design of the headlamp arrangement 26. The view window 94 includes an outer portion 96 and a middle portion 98, each made from a transparent material 98, preferably clear, hard plastic. Means for mounting the view window 94 to the stationary housing 24 is provided and may comprise a pair of screws 100 which mount through bosses 102 extending outwardly from the outer portion 96 and seat within corresponding threaded apertures 104 provided in the stationary housing 24 proximate to the opening 36. Each screw 100 has a threaded shank portion which extends from a head. The head has a TORX® drive system provided thereon for rotating the screw, but may be provided with other hex drive systems. Thus, when mounted, the indicator device 20 is positioned immediately below the opening 36 in the stationary housing 24 so that the U-shaped track portion 50 and the bubble level assembly 42 can be viewed from the exterior of the headlamp arrangement 26.

Following assembly of the vehicle to which the headlamp position indicator device 20 of the present invention is to be attached, each movable reflector component 22 is set to their desired or "zero" position by using photometric metering equipment or the like and manually moving the movable reflector component 22 until the reflector beams point in the desired location by using the adjustor mechanisms 25, 27. Once the desired zero position is attained, the movable reflector component 22 is not moved again.

To denote the vertical zero positioning of the moveable headlamp component, the air bubble 78 in the vial 76 is used. In order to denote the vertical zero position, the air bubble 78 in the bubble level assembly 42 must be moved to the center of the vial 76 as denoted by the graduations 80. To cause the air bubble 78 to move along the length of the vial 76, the angle at which the vial 76 is disposed relative to the projection 32 must be changed. To change the angle, the adjusting screw member 46 is rotated which causes the boss 82 and thus, the vial 76 and tongue portion 74 of the stamping 44, to translate along the length of the threaded screw shank 86 because of the threaded engagement between the adjusting screw member 46 and the elongated, threaded bore 83 in the boss 82. During rotation of the adjusting screw member 46, the end of the adjusting screw member 46 rotates against the forwardly extending tang 73 of the stamping 44 which is backed by the base portion 48. In addition, the tongue portion 74 flexes relative to the frame portion 72. As the vial 76 angle is changed, the air bubble 78 moves along the length of the vial 76. The air bubble 78 is moved until it is positioned at the middle of the vial 76. This denotes the vertical zero positioning of the moveable reflector component 22. The bubble level assembly 42 is not again moved. Any motion of the moveable reflector component 22 moves the air bubble 78 in the vial 76 out of the middle or zero position of the vial 76.

Thereafter, if the headlight becomes misaligned, the headlight can be easily returned to its zero position. To do so, the vertical headlamp adjustor mechanism 27 is used to move the movable reflector component 22 until the air bubble 78 once again become centered in the vial 76. The angle of the vial 76 relative to the movable reflector component 22 is not changed. Once the bubble 78 is re-centered in the vial 76, the headlamp will be returned to its vertical zero position.

To denote the horizontal positioning of the moveable reflector component 22, the indicator arrow member 66 provided on the track portion 50 and the graduations 39 on the horizontal scale 38 mounted on the stationary housing 24 are used. The indicator arrow member 66 is slid along the track portion 50 until the pointer 70 is moved to the zero position which is indicated by the graduations 39 on the horizontal scale 38. The indicator arrow member 66 is not again moved and may be secured in place by adhesive or the like, or may be held in place because of the friction between the indicator arrow member 66 and the track portion 50. If a right hand orientation is necessary, the indicator arrow member 66 is slid to the right side of the device 20 along relatively linear section 62 and likewise, if a left hand orientation is necessary, the indicator arrow member 66 is slid around the curved section 58 to the left side of the device 20 along relatively linear section 60. The reduced width of the curved section 58 provides for the easy movement of the indicator arrow member 66 around the track. Thus, if the headlamp moves out of the horizontal position, the indicator device 20 will register this movement. Any motion of the moveable reflector component 22 moves the pointer 70 in relation to the horizontal scale 38. This is why it is necessary to have the indicator device 20 be mounted to the projection 32 at a predetermined distance from the pivot 23 (the point at which the moveable component 22 pivots relative to the stationary housing 24) so that horizontal movement can be detected. That is, the greater the distance from the pivot 23, the more movement will manifest itself vis-a-vis the pointer 70 and graduations 39.

Thereafter, if the headlight becomes misaligned, the headlight can be easily returned to its zero position. To do so, the horizontal headlamp adjustor mechanism 25 is used to move the movable reflector component 22 until the pointer 70 aligns with the zero position on the horizontal scale 38. Once the pointer 70 aligns with the zero graduation on the horizontal scale 39, the headlamp will be returned to its horizontal zero position.

With the prior art, it is necessary to have two mirror image components that can be used with right and left-hand assemblies. This presents some problems in the overall assembly operation as the operators must be sure they have the right components for the right-hand and left-hand sides as they are not interchangeable. With the indicator device 20 of the present invention, because of the novel track design, the indicator device 20 can be used for both right-hand and left-hand applications, and it is only necessary for the operator to slide the pointer 70 around the U-shaped track portion 50 for right-hand and left-hand movement as necessary. The reduced thickness of the curved section 58 of the U-shaped track portion 50 allows for the easy movement of the indicator arrow member 66 from the relatively linear sections 60, 62 to the curved section 58 and around the curved section 58. If the curved section 58 is the same thickness as the relatively linear sections 60, 62 of the U-shaped track portion 50, the indicator arrow member 66 cannot be swung around.

The view window 94 can be removed from engagement with the stationary housing 24 by removing the screws 100 and lifting it away from the housing 24 to expose the opening 36 in the stationary housing 24. The opening 36 in the stationary housing 24 provides access so that the operator or mechanic can manipulate the pointer 70 to the desired position.

While a preferred embodiment of the present invention is shown and described, it is envisioned that those skilled in the art may devise various modifications of the present invention without departing from the spirit and scope of the appended claims.

The invention claimed is:

1. A non-handed indicator device for indicating a horizontal zero position of a movable reflector housed in a stationary housing of a headlamp arrangement for an automobile, wherein said headlamp arrangement is on the left or right side of the automobile, said stationary housing having an opening formed therethrough with a zero indicia provided on said stationary housing proximate to said opening, said non-handed indicator device comprising: a bracket for operative mounting on said reflector beneath said opening in said stationary housing, said bracket including a U-shaped track portion including a curved section and relatively linear leg sections; an arrow member mounted on said U-shaped track portion and slidable relative thereto around said U-shaped track portion for positioning on either one or other of said leg sections, such that said arrow member is movable to point along one or the other of said leg sections for alignment with said zero indicia for providing an indication of the horizontal zero position of the reflector.

2. A non-handed indicator device as defined in claim 1, wherein said curved section has a width which is less than the width of each relatively linear leg section.

3. A non-handed indicator device as defined in claim 1, further including a bubble level assembly mounted on said bracket for providing an indication of when said reflector is vertically zeroed.

4. A non-handed indicator device as defined in claim 1, further including a projection extending outwardly from said bracket for operative engagement with a pocket formed in said reflector.

5. In combination, a headlamp arrangement and a non-handed indicator device, said headlamp arrangement comprising a movable reflector housed in a stationary housing, said stationary housing having an opening formed therethrough with a zero indicia provided on said stationary housing proximate to said opening;

said non-handed indicator device comprising a bracket mounted on said movable reflector beneath said opening in said stationary housing, said bracket including a U-shaped track portion; an arrow member mounted on said U-shaped track portion and slidable around said U-shaped track portion, said arrow member being movable to a location to align with said zero indicia for providing an indication of the horizontal zero position of the reflector.

6. The combination as defined in claim 5, wherein said U-shaped track portion of said non-handed indicator device includes a curved section and a pair of relatively linear sections extending from opposite ends of said curved section, said curved section having a width which is less than the width of each relatively linear section.

7. The combination as defined in claim 5, wherein said zero indicia is provided on a projection mounted on said housing proximate to said opening.

8. The combination as defined in claim 5, wherein said reflector further includes a pocket formed thereon and wherein said non-handed indicator device further includes a projection extending outwardly from said bracket, said projection engaging within said pocket.

9. The combination as defined in claim 5, further including a window member mounted on said housing over said opening for covering said opening.

10. The combination as defined in claim 5, wherein said non-handed indicator device further includes a bubble level assembly mounted on said bracket for providing an indication of the vertical zero position of the reflector.

11. The combination as defined in claim 5, further including at least one adjustor mechanism for adjusting the position of the reflector relative to the stationary housing.

12. The combination as defined in claim 5, wherein said zero indicia indicates a plurality of indicia including a zero position and equally spaced segments on opposite sides of said zero position.

13. A method of providing an indication of the horizontal zero position of a headlamp reflector mounted in a stationary housing of a headlamp arrangement whether right or left hand mounted, said stationary housing having an opening provided therethrough, said method comprising the steps of: mounting a non-handed indicator device on said reflector beneath said opening in said stationary housing, said non-handed indicator device including a bracket having a U-shaped track portion including spaced generally linear leg sections on each side, and providing an arrow member slidably mounted on said U-shaped track portion; providing a zero indicia on said stationary housing proximate to said opening; zeroing said reflector by moving said reflector to a desired position; and therefore sliding said arrow member around said U-shaped track portion to select the linear leg section proximate to said zero indicia and aligning said arrow member with said zero indicia.

* * * * *